United States Patent
Shindo

(10) Patent No.: US 9,456,351 B2
(45) Date of Patent: Sep. 27, 2016

(54) MOBILE COMMUNICATION SYSTEM, BASE STATION, COMMUNICATION METHOD AND NON-TRANSITORY COMPUTER-READABLE MEDIUM STORING PROGRAM

(71) Applicant: NEC Corporation, Tokyo (JP)

(72) Inventor: Masato Shindo, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 14/647,988

(22) PCT Filed: Jul. 10, 2013

(86) PCT No.: PCT/JP2013/004262
§ 371 (c)(1),
(2) Date: May 28, 2015

(87) PCT Pub. No.: WO2014/083720
PCT Pub. Date: Jun. 5, 2014

(65) Prior Publication Data
US 2015/0312769 A1    Oct. 29, 2015

(30) Foreign Application Priority Data
Nov. 29, 2012 (JP) .................. 2012-260717

(51) Int. Cl.
*H04W 40/00* (2009.01)
*H04W 16/10* (2009.01)
(Continued)

(52) U.S. Cl.
CPC ............. *H04W 16/10* (2013.01); *H04W 16/08* (2013.01); *H04W 52/02* (2013.01); *H04W 52/0206* (2013.01); *H04W 92/20* (2013.01); *Y02B 60/50* (2013.01)

(58) Field of Classification Search
CPC ....................................................... H04W 16/10
USPC ......................................................... 455/446
See application file for complete search history.

(56) References Cited

U.S. PATENT DOCUMENTS 6,597,922 B1 *  7/2003  Ling et al. ..................... 455/522
2004/0092287 A1 *  5/2004  Hori et al. ................. 455/552.1
(Continued)

FOREIGN PATENT DOCUMENTS

WO    WO 2011/137686 A1    11/2011
WO    WO 2012/130000 A1    10/2012

OTHER PUBLICATIONS

3GPP TR 36.927 V11.0.0, "Potential solutions for energy saving for E-UTRAN", (Release 11), Sep. 2012.
(Continued)

*Primary Examiner* — Santiago Garcia
(74) *Attorney, Agent, or Firm* — Finnegan, Henderson, Farabow, Garrett & Dunner LLP

(57) ABSTRACT

Provided are a mobile communication system, a base station, a communication method and a program whereby respective cells can be changed to an energy saving cell or a Compensation Cell, while minimizing the occurrence of interference. The mobile communication system according to the present invention has a base station (11) having a cell (1), and a base station (20) having a cell (2). Furthermore, the base station (20) according to the present invention sends first information indicating that preparations for change of the cell (1) to an energy saving state have been completed, to the base station (20).

30 Claims, 17 Drawing Sheets

(51) Int. Cl.
*H04W 16/08* (2009.01)
*H04W 52/02* (2009.01)
*H04W 92/20* (2009.01)

(56) References Cited

U.S. PATENT DOCUMENTS

| | | | | |
|---|---|---|---|---|
| 2004/0106408 | A1* | 6/2004 | Beasley et al. | 455/436 |
| 2007/0297363 | A1* | 12/2007 | Jalil et al. | 370/330 |
| 2011/0300871 | A1* | 12/2011 | Dottling et al. | 455/446 |
| 2012/0004009 | A1* | 1/2012 | Lindoff | H04W 52/0232 455/522 |
| 2012/0157002 | A1* | 6/2012 | Choi | 455/67.11 |

OTHER PUBLICATIONS

CATT, "The solution for the compensation scenario", [online], 3GPP TSG RAN WG3#75bis, R3-120512, retrieved from the Internet: URL:http://ftp.3gpp.org/tsg_ran/WG3_lu/TSGR3_75bis/Docs/R3-120512.zip, retrieved on Jul. 29, 2013, Feb. 2012.
ZTE, "Compensation mode energy saving", [online], 3GPP TSG RAN WG3 #74, R3-112907, retrieved from the Internet: URL:http://ftp.3gpp.org/tsg_ran/WG3_lu/TSGR3_74/docs/R3-112907.zip, retrieved on Jul. 29, 2013, Nov. 2011.
Alcatel-Lucent Shanghai Bell, Alcatel-Lucent, "Energy saving solutions for inter-eNB scenario 2", [online], 3GPP TSG RAN WG3 #75, R3-120273, retrieved from the Internet: URL:http://ftp.3gpp.org/tsg_ran/WG3_lu/TSGR3_75/docs/R3-120273.zip, retrieved on Jul. 29, 2013, Feb. 2012.
International Search Report mailed Aug. 6, 2013 in corresponding PCT International Application.
ZTE, "The solution for compensation mode energy saving", 3GPP TSG RAN WG3 #73b, R3-112530, pp. 1-5, Oct. 2011.
Huawei, "LTE energy saving solution proposal to cell switch off/on", 3GPP TSG-RAN WG3 #66bis, R3-100163, pp. 1-2, Jan. 2010.
Alcatel-Lucent Shanghai Bell et al., "Discussion on inter-eNB energy saving Scenario 2", 3GPP TSG-RAN WG3, Meeting #70bis, R3-110248, Jan. 2011.
Extended European Search Report mailed Jun. 21, 2016 by the European Patent Office in counterpart European Patent Application No. 13859314.0.
ZTE, "The solution for compensation mode energy saving", 3GPP TSG RAN WG3 #72, R3-111358, pp. 1-73, May 2011.
"Message and Information Element Abstract Syntax (with ASN.1)", TS Group Radio Access Network: Evolved Universal Terrestrial Radio Access Network (E-UTRAN):X2 application protocol (X2AP) (Release 10), 3GPP TS 36.423 V10.5.0, pp. 74-132, Mar. 2012.
Office Action mailed Jul. 27, 2016 by the Korean Patent Office in counterpart Korean Patent Application No. 2015-7014069.

* cited by examiner

| >Deactivation Indication | 0 | ENUMERATED (deactivated, ...) | Indicates the concerned cell is switched off for energy saving reasons | YES | ignore |
|---|---|---|---|---|---|

Fig. 5

| >Neighbour Information forCompensation | 0..<maxnoof Neighbours> | | | - | - |
|---|---|---|---|---|---|
| >>ECGI | 0 | ECGI 9.2.14 | | E-UTRAN Cell Global Identifier of the neighbour cell | - |
| >>PCI | 0 | INTEGER (0..503, ...) | | Physical Cell Identifier of the neighbour cell | - |
| >>EARFCN | 0 | 9.2.26 | | DL EARFCN for FDD and EARFCN for TDD | - |

Fig. 10

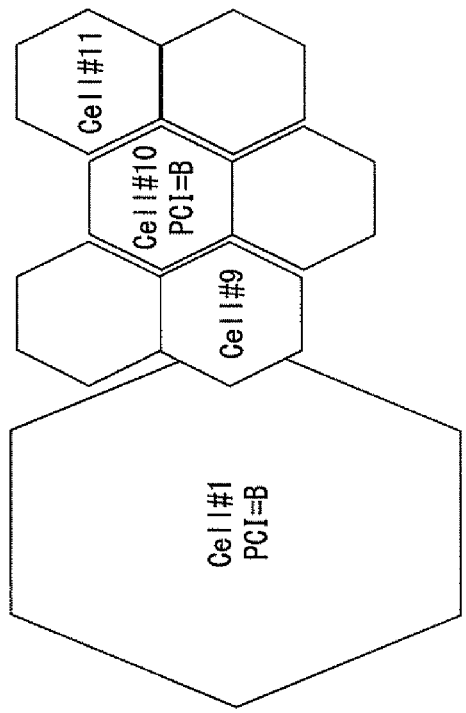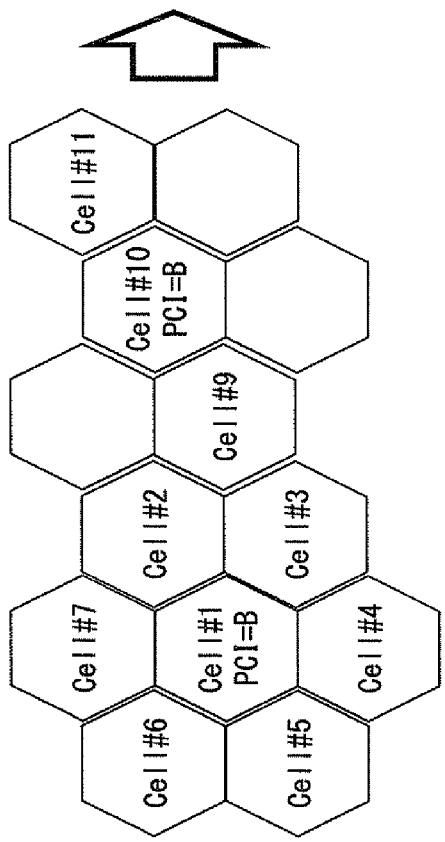
Fig. 17

MOBILE COMMUNICATION SYSTEM, BASE STATION, COMMUNICATION METHOD AND NON-TRANSITORY COMPUTER-READABLE MEDIUM STORING PROGRAM

CROSS-REFERENCE TO RELATED PATENT APPLICATIONS

This application is a National Stage Entry of International Application No. PCT/JP2013/004262, filed Jul. 10, 2013, which claims priority from Japanese Patent Application No. 2012-260717, filed Nov. 29, 2012. The entire contents of the above-referenced applications are expressly incorporated herein by reference.

TECHNICAL FIELD

The present invention relates to a mobile communication system, a base station, a communication method and a program, and more particularly, to a mobile communication system, a base station, a communication method and a program for implementing energy saving control in cells.

BACKGROUND ART

There are mobile communication networks, wherein, in cases where there are few mobile stations located within a cell managed by a certain base station, or where the data communication volume of the mobile stations located within the cell is small, or the like, the base station changes to an Energy Saving State. The Energy Saving State is defined in the 3GPP technical specifications, and may be, for example, a state where several functions in the base station are halted, or where use of the resources in the base station is limited.

When a base station has been changed to an Energy Saving State, the coverage area of the cell managed by the base station is reduced. Therefore, the area which is no longer managed due to reduction of the cell coverage area as a result of change of the base station to an Energy Saving State is compensated for by increasing the coverage area of the cell of another base station. A state where the coverage area of the cell of one base station is used to compensate when another base station has changed to an Energy Saving State is called a "compensatingForEnergySaving state". The compensatingForEnergySaving state is also defined in the 3GPP technical specifications.

Here, the changes in network configuration associated with a change of a base station to an Energy Saving State, as disclosed in Non-Patent Document 1, will be described with reference to FIGS. 13 and 14. FIG. 13 shows a case where base stations managing cell B to cell G have changed to an Energy Saving State, and the base station which is managing cell A is compensating for cell B to cell G. Here, a cell which is managed by a base station that has changed to the Energy Saving State is called an "energy saving cell" and a cell which is configured so as to compensate for an energy saving cell is called a "Compensation Cell". In other words, cell A is a Compensation Cell, and cell B to cell G are energy saving cells.

Next, FIG. 14 shows a state where cell A becomes an energy saving cell due to the base station which manages cell A changing to an Energy Saving State. Moreover, FIG. 14 shows a case where cell B to cell G become Compensation Cells, due to the base stations which manage cell B to cell G compensating for cell A.

CITATION LIST

Non Patent Literature

[Non-Patent Document 1] 3GPP TR36.927 V11.0.0 Potential solutions for energy saving for E-UTRAN (Release 11) (2012-09)

SUMMARY OF INVENTION

Technical Problem

However, in the network configuration disclosed in Non-Patent Document 1, there is a problem in that excessive interference occurs due to interference between the energy saving cells and Compensation Cells. Here, the flow of processing in which excessive interference occurs will be described with reference to FIG. 15. The following conditions are assumed in the description of the flow of processing in FIG. 15. Cell A is expanded so as to compensate for cell B and cell C and becomes a Compensation Cell, when cell B and cell C are changed to energy saving cells. In other words, the combination of the energy saving cells and Compensation Cells is previously determined by advance OAM settings, or the like.

Firstly, the base station which manages cell B is set to a normal state (non-Energy Saving State) in which the cell is not changed to an Energy Saving State (S101). Furthermore, the base station managing cell C has changed to an Energy Saving State (S102). In this case, the base station managing cell C sends an X2AP: ENB CONFIG UPDATE message to the base station managing cell A (S103). The X2AP:ENB CONFIG UPDATE message includes information indicating that the cell has changed to an Energy Saving State. The information indicating a change to an Energy Saving State is set as: "Deactivation Indication"="Deactivated". Next, the base station managing cell A changes to a compensatingForEnergySaving state (S104). By changing cell A to a compensatingForEnergySaving state, the coverage area of cell A is enlarged. In this case, cell A is enlarged so as to compensate for cell B and cell C. Therefore, interference occurs between cell A and cell B, which has not changed to an Energy Saving State. Subsequently, when the base station managing cell B changes to an energy saving state, the base station managing cell B sends an X2AP:ENB CONFIG UPDATE message to the base station managing cell A.

In this way, a problem occurs in that interference arises between cell A and cell B, from the change of cell A to a Compensation Cell due to the change of cell C to an energy saving cell, until cell B changes to an energy saving cell.

In order to resolve problems of this kind, it is an object of the present invention to provide a mobile communication system, a base station, a communication method and a program whereby respective cells can be changed to an energy saving cell or a Compensation Cell, while minimizing the occurrence of interference.

Solution to Problem

The mobile communication system according to a first aspect of the present invention includes a first base station having a first cell; and a second base station having a second cell; wherein the first base station sends first information indicating that preparations for change of the first cell to an energy saving state have been completed, to the second base station.

The base station according to a second aspect of the present invention is a base station having a first cell, wherein, in a case where a configuration is adopted whereby, when the first cell changes to an energy saving state and a coverage area of the first cell is reduced, then a coverage area of a second cell is enlarged so as to compensate for the first cell, the base station includes a communication unit for communicating with a second base station having the second cell, and first information indicating that preparations for change of the first cell to the energy saving state have been completed is sent to the second base station via the communication unit.

The communication method according to a third aspect of the present invention is a communication method used in a base station having a first cell, wherein, in a case where a configuration is adopted whereby, when the first cell changes to an energy saving state and a coverage area of the first cell is reduced, then a coverage area of a second cell is enlarged so as to compensate for the first cell, first information indicating that preparations for change of the first cell to the energy saving state have been completed is sent to a second base station having the second cell.

The program according to a fourth aspect of the present invention is a program which is executed by a computer in a base station having a first cell, wherein, in a case where a configuration is adopted whereby, when the first cell changes to an energy saving state and a coverage area of the first cell is reduced, then a coverage area of a second cell is enlarged so as to compensate for the first cell; the program causes the computer to execute a step for sending first information indicating that preparations for change of the first cell to the energy saving state have been completed, to a second base station having the second cell.

Advantageous Effects of Invention

According to the present invention, it is possible to provide a mobile communication system, a base station, a communication method and a program whereby respective cells can be changed to an energy saving cell or a Compensation Cell, while minimizing the occurrence of interference.

BRIEF DESCRIPTION OF THE DRAWINGS

FIG. 5 is a schematic drawing of "Deactivation Indication" according to the first embodiment;

FIG. 10 is a diagram showing information added under "Served Cell To Add/Modify" according to the third embodiment;

FIG. 17 is a network configuration diagram in a case where overlapping of PCIs occurs.

DESCRIPTION OF EMBODIMENTS

First Embodiment

Figure 1:
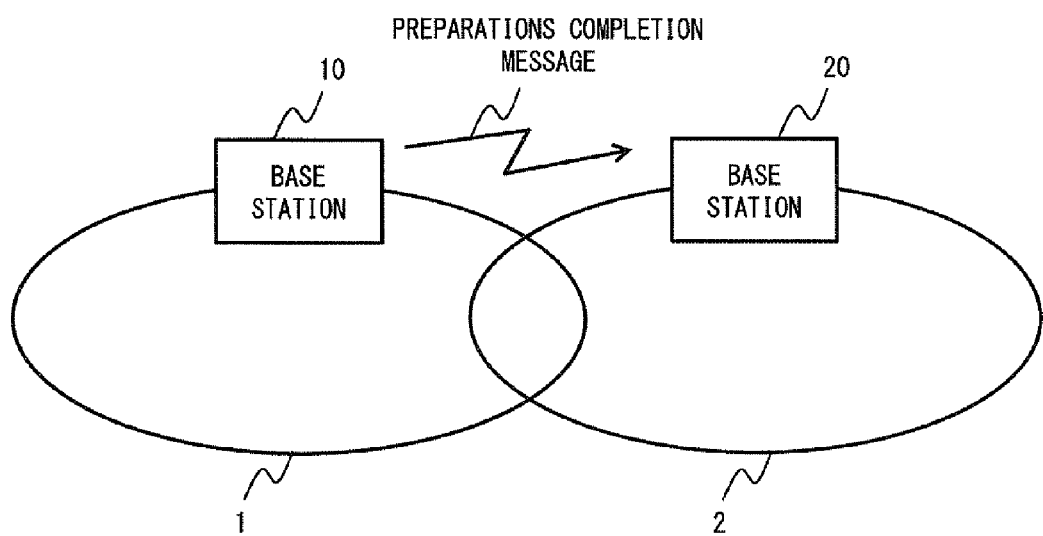
FIG. 1 is a schematic drawing of a mobile communication system according to a first embodiment.

Below, embodiments of the present invention are described with reference to the drawings. Firstly, an example of the configuration of a mobile communication system according to a first embodiment of the present invention will be described with reference to FIG. 1. The mobile communication system illustrated in FIG. 1 has a base station 10 having a cell 1, and a base station 20 having a cell 2. In other words, the base station 10 manages the area of cell 1 as a coverage area, and the base station 20 manages the area of cell 2 as a coverage area. The base station 10 and the base station 20 may be an eNodeB (eNB), or NodeB, etc., as specified in the 3GPP technical specifications. eNB is mainly used in order to achieve an LTE method, which is a wireless access method specified in the 3GPP technical specifications.

Here, the base station 10 is a base station which changes to an Energy Saving State, and the base station 20 is a base station which changes to a compensatingForEnergySaving state. In a case of this kind, before the base station 10 changes to an Energy Saving State, information indicating that preparations for change to an Energy Saving State have been completed (called a "preparations completion message" below) is transmitted to the base station 20.

The base station 20 can control the timing at which the base station 10 changes to an Energy Saving State, by receiving a preparations completion message indicating that preparations for change to an Energy Saving State have been completed, before the base station 10 changes to an Energy Saving State. In this way, the base station 20 can prevent the occurrence of interference between the energy saving cell and the Compensation Cell, by controlling the timing of change to an Energy Saving State of a plurality of base stations including the base station 10.

Figure 2:
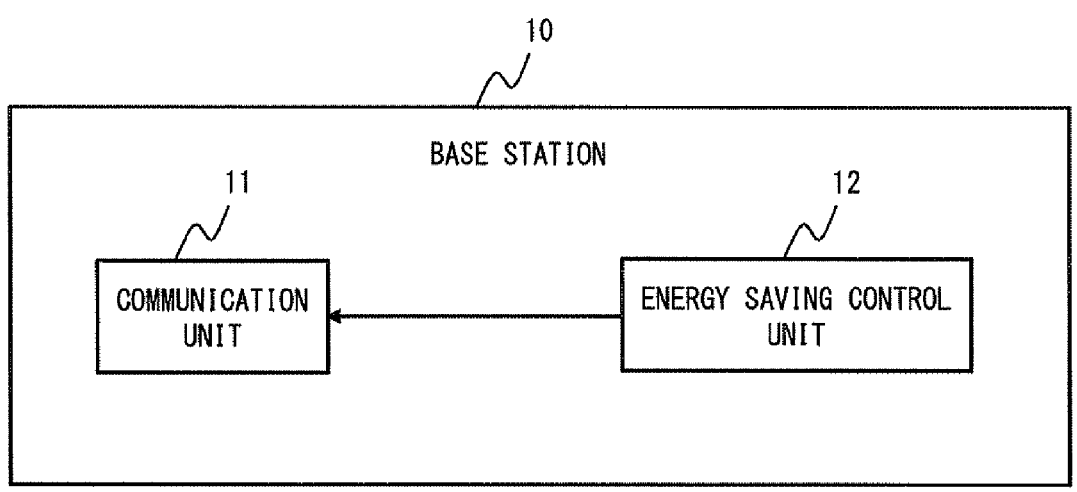
FIG. 2 is a schematic drawing of a base station according to the first embodiment.

Next, an example of the configuration of a base station 10 according to the first embodiment of the present invention will be described with reference to FIG. 2. Here, the base station 10 is described as a base station which is managing an energy saving cell. The base station 10 has a communication unit 11 and an energy saving control unit 12. The communication unit 11 performs communications with other base stations, by using an X2 interface.

The energy saving control unit 12 controls whether or not the base station 10 changes to an Energy Saving State. For example, the base station 10 may be changed to an Energy Saving State when the number of mobile stations located inside cell 1 is small, or when the data communication volume in the mobile stations located inside the cell 1 is small, or the like.

In other words, the energy saving control unit 12 may previously determine a threshold value relating to the number of mobile stations located inside the cell 1, and may change the base station 10 to the Energy Saving State when it is detected that a number of mobile stations lower than the previously determined threshold value is located inside the cell 1. Alternatively, the energy saving control unit 12 may previously determine a threshold value relating to the data communication volume of the mobile stations located inside the cell 1, and may change the base station 10 to the Energy Saving State when it is detected that the data communication volume is lower than the previously determined threshold value.

The timing at which the base station 10 changes to an Energy Saving State is not limited to this, and the base station 10 may change to the Energy Saving State in accordance with other criteria. The information relating to the threshold value for the number of mobile stations or the data communication volume, etc. may be stored in a memory, or the like, inside the base station 10, or may be stored in a host device of the base station 10, or the like. For instance, the host device may be a MME (Mobility Management Entity) or RNC (Radio Network Controller) which is determined in the 3GPP technical specifications.

The energy saving control unit 12 sends information indicating that the base station 10 has completed preparations for change or shift to an Energy Saving State (preparations completion message), to the base station 20, via the communication unit 11, when the timing for changing the base station 10 to an Energy Saving State is detected. The energy saving control unit 12 still does not change the base station 10 to an Energy Saving State at the stage of sending the preparations completion message to the base station 20. The energy saving control unit 12 changes the base station 10 to the Energy Saving State, upon receiving an instruction for change to an Energy Saving State from the base station 20.

Figure 3:
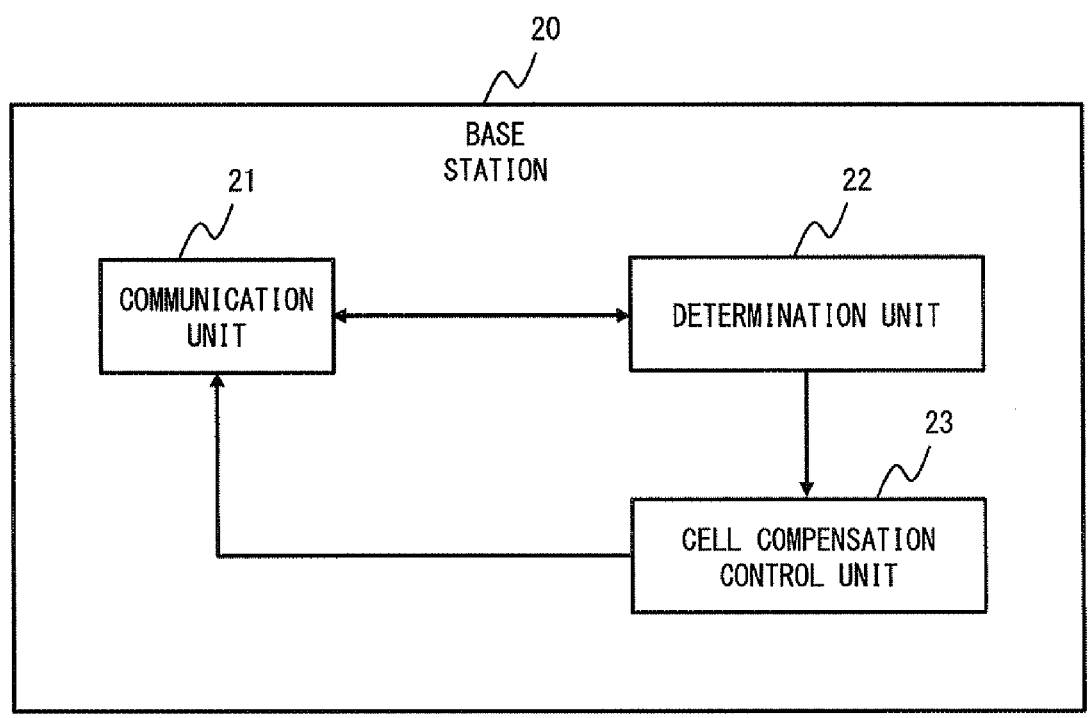
FIG. 3 is a schematic drawing of a base station according to the first embodiment.

Next, an example of the configuration of a base station 20 according to the first embodiment of the present invention will be described with reference to FIG. 3. Here, the base station 20 is described as a base station which is managing a Compensation Cell. The base station 20 has a communication unit 21, a determination unit 22 and a cell compensation control unit 23. The communication unit 21 performs communications with other base stations, by using an X2 interface. The communication unit 21 receives a preparations completion message from the plurality of base stations which are changed to an Energy Saving State. Moreover, the communication unit 21 sends a change instruction message prompting change to an Energy Saving State, to the plurality of base stations that are to change to an Energy Saving State.

The determination unit 22 determines whether or not a preparations completion message has been received, from the base station which is managing a peripheral cell that has been previously determined as a Compensation Cell. The combination of energy saving cells and Compensation Cells is determined previously. For example, in FIG. 13, it is previously determined that, if the energy saving cells are cell B and cell C, then the Compensation Cell is to be cell A. In cases such as these, the determination unit 22 determines whether or not a preparations completion message has been received from the plurality of base stations which are managing the previously determined combination of the energy saving cells (the base station managing cell B and the base station managing cell C). The determination unit 22 outputs the determination result to the cell compensation control unit 23. Moreover, the determination unit 22 also determines whether or not a message reporting a change to an Energy Saving State has been received from the plurality of base stations which are managing the previously determined combination of energy saving cells.

When a determination result indicating that a preparations completion message has been received from the plurality of base stations managing the previously determined combination of energy saving cells is output by the determination unit 22, then the cell compensation control unit 23 sends a change instruction message prompting change to an Energy Saving State, to the plurality of base stations managing the previously determined combination of energy saving cells, via the communication unit 21. Moreover, the cell compensation control unit 23 changes the base station 20 to a compensatingForEnergy Saving State, when a determination result is output which indicates that a message reporting change to an Energy Saving State has been received from the plurality of base stations which are managing the previously determined combination of energy saving cells.

Figure 4:
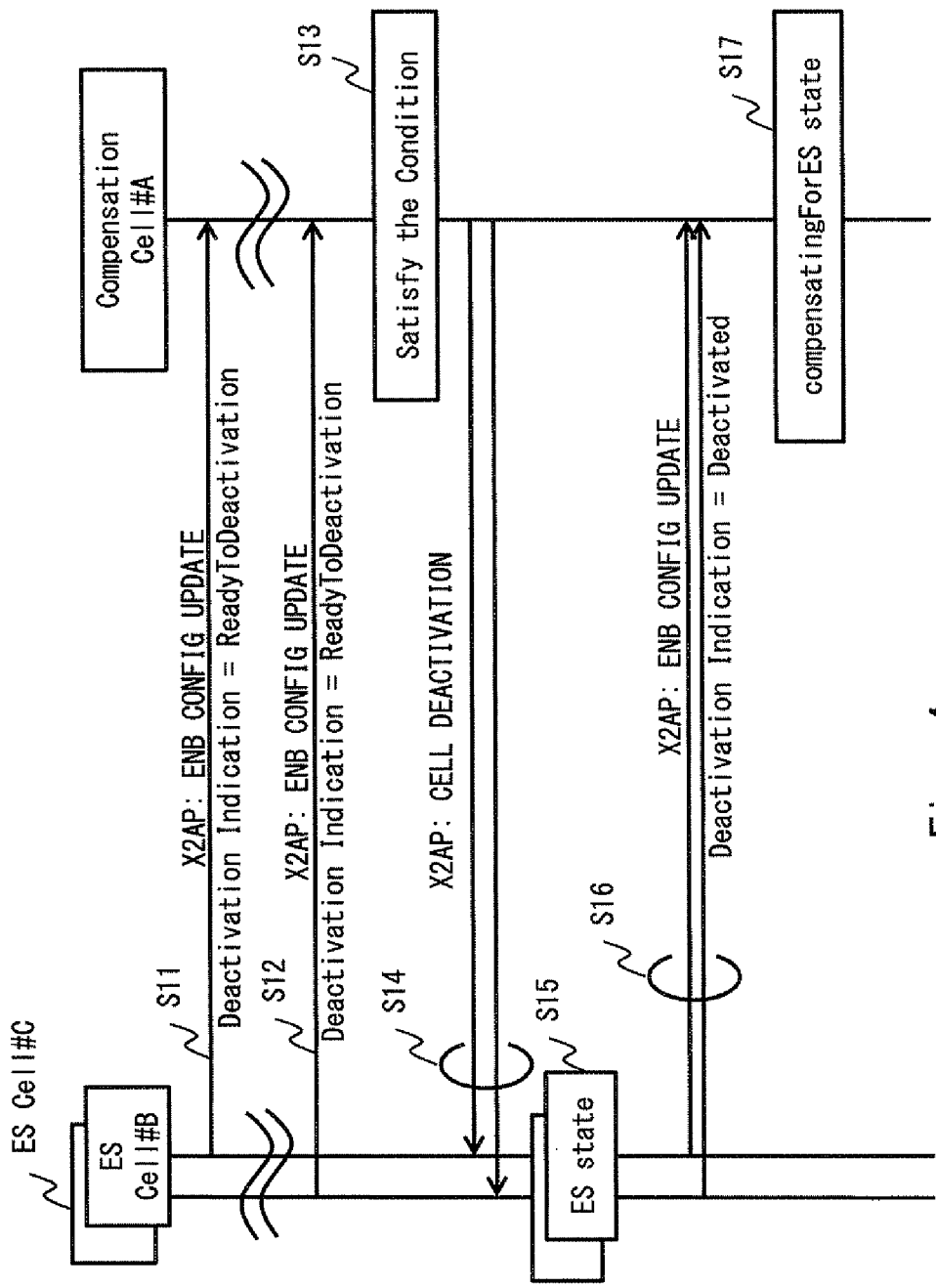
FIG. 4 is a diagram showing a flow of processing for change to an Energy Saving State and a compensatingForEnergySaving state according to the first embodiment.

Next, the flow of processing for change to an Energy Saving State according to a first embodiment of the present invention and the flow of processing for change to a compensatingForEnergySaving state will be described with reference to FIG. 4. Here, a case is described in which an eNB is used as a base station. Moreover, the names of the transmitted messages in FIG. 4 use the message names established in the 3GPP technical specifications, or newly established message names. Furthermore, the illustration in FIG. 4 is based on the assumption that, in FIG. 13, if the energy saving cells are cell B and cell C, then the Compensation Cell is cell A. Furthermore, the "ES Cell #B" in the drawings indicates a base station which is managing cell B and which is changing to an Energy Saving State. This applies similarly to the "ES Cell #C". "Compensation Cell #A" indicates a base station which is managing cell A and which is changing to a compensatingForEnergySaving state.

Firstly, ES Cell #B sends an X2AP: ENB CONFIG UPDATE message to Compensation Cell #A, upon detecting the timing for change to an Energy Saving State (S11).

Here, an example of the configuration of the "Deactivation Indication" setting in the X2AP: ENB CONFIG UPDATE message will be described using FIG. 5. An information element called "ENUMERATED" is set in the Deactivation Indication. The contents reported by using the X2AP: ENB CONFIG UPDATE message are determined in accordance with the value set for ENUMERATED. For example, if ENUMERATED is set to "Deactivated", then this indicates that the base station sending the X2AP: ENB CONFIG UPDATE message has changed to an Energy Saving State. If ENUMERATED is set to "ReadyToDeactivation", then this indicates that the base station sending the X2AP: ENB CONFIG UPDATE message has completed preparations for change to an Energy Saving State. In other words, an X2AP: ENB CONFIG UPDATE message in which ENUMERATED is set to "ReadyToDeactivation" corresponds to a preparations completion message (S13).

Returning to FIG. 4, upon detecting the timing for change to an Energy Saving State, ES Cell #C sends an X2AP:ENB CONFIG UPDATE message to Compensation Cell #A (S12). In steps S11 and S12, an X2AP: ENB CONFIG UPDATE message set to "ReadyToDeactivation" is used. Next, Compensation Cell #A determines that a preparations completion message has been received from the plurality of base stations (ES Cell #B and ES Cell #C) managing the previously determined combination of energy saving cells, by receiving an X2AP: ENB CONFIG UPDATE message set to "ReadyToDeactivation" from the ES Cell #B and ES Cell #C which become energy saving cells when Cell #A itself becomes a Compensation Cell.

Next, Compensation Cell #A sends an X2AP: CELL DEACTIVATION message to ES Cell #B and ES Cell #C (S14). The X2AP: CELL DEACTIVATION message corresponds to a change instruction message for ES Cell #B and ES Cell #C.

Next, upon receiving the X2AP: CELL DEACTIVATION message, ES Cell #B and ES Cell #C change to an Energy Saving State (S15). Thereupon, because ES Cell #B and ES Cell #C have changed to an Energy Saving State, an X2AP: ENB CONFIG UPDATE message in which ENUMERATED in the Deactivation Indication is set to "Deactivated" is sent to the Compensation Cell #A (S16). Thereupon, Compensation Cell #A changes to a compensating for ES state (S17).

Figure 6:
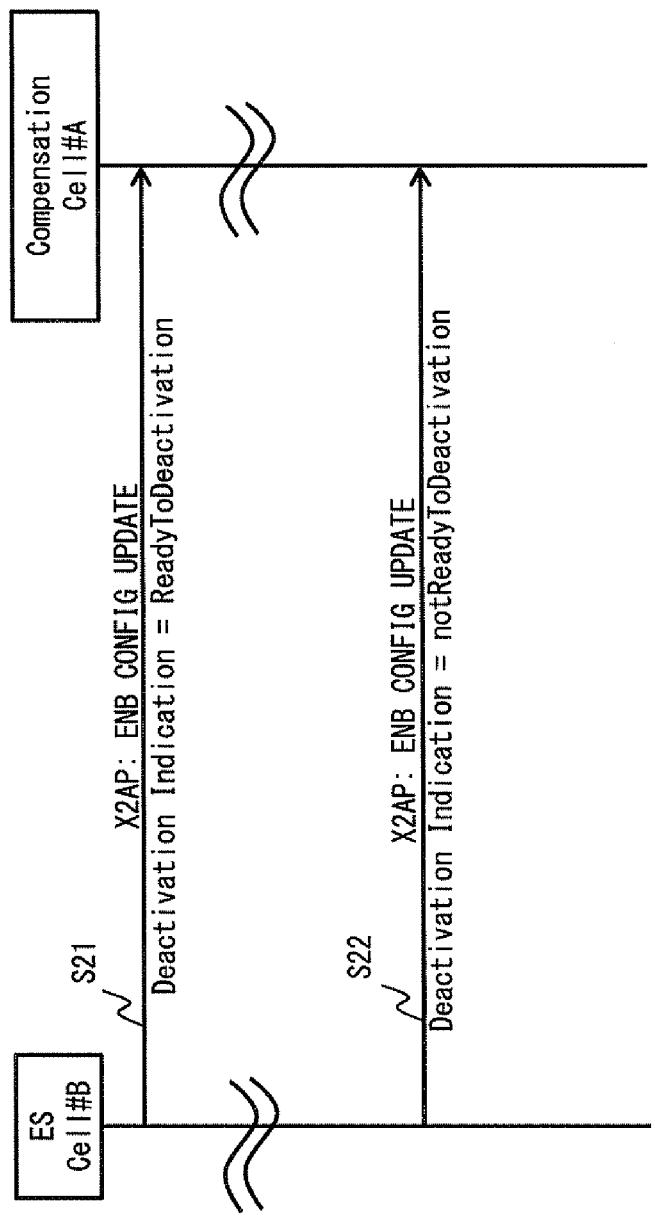
FIG. 6 is a diagram showing a flow of processing when cancelling a preparations completed state in which preparations for change to an Energy Saving State have been completed, according to the first embodiment.

Next, the flow of processing when cancelling the preparations completed state in which preparations for change to the Energy Saving State have been completed according to the first embodiment of the present invention will be described with reference to FIG. 6.

Firstly, ES Cell #B sends an X2AP:ENG CONFIG UPDATE message to Compensation Cell #A, upon detecting the timing for change to an Energy Saving State (S21).

Here, ES Cell #B also sends an X2AP: ENB CONFIG UPDATE message to Compensation Cell #A when cancelling change to an Energy Saving State, because the number of mobile stations located in cell B has increased, or because the data communication volume in the mobile stations located in cell B has increased, for instance (S22). In the X2AP: ENB CONFIG UPDATE message sent in step S22, ENUMERATED in the Deactivation Indication is set to "notReadyToDeactivation". Since ENUMERATED is set to "notReadyToDeactivation", then the preparations completed state in which preparations for change to an Energy Saving State have been completed, is cancelled.

By using a mobile communication system according to the first embodiment of the present invention described above, it is possible to control the timing of change to an Energy Saving State and a compensatingForEnergySaving state, in a plurality of base stations. More specifically, by using a preparations completion message, it is possible to control the timing at which the previously combined neighboring base stations are changed to an Energy Saving State. Therefore, by changing the base station which is managing cell A to a compensatingForEnergySaving state after changing the base stations which are managing cell B and cell C to an Energy Saving State, for example, it is possible to prevent the occurrence of interference between the energy saving cells and the Compensation Cell.

Moreover, by providing a new setting "notReadyToDeactivation", then even when in a preparations completed state in which the preparations for change to an Energy Saving State have been completed, it is still possible to cancel the preparations completed state, easily, in accordance with change in the environment, such as variation in the number of mobile stations located in a cell.

Figure 16:
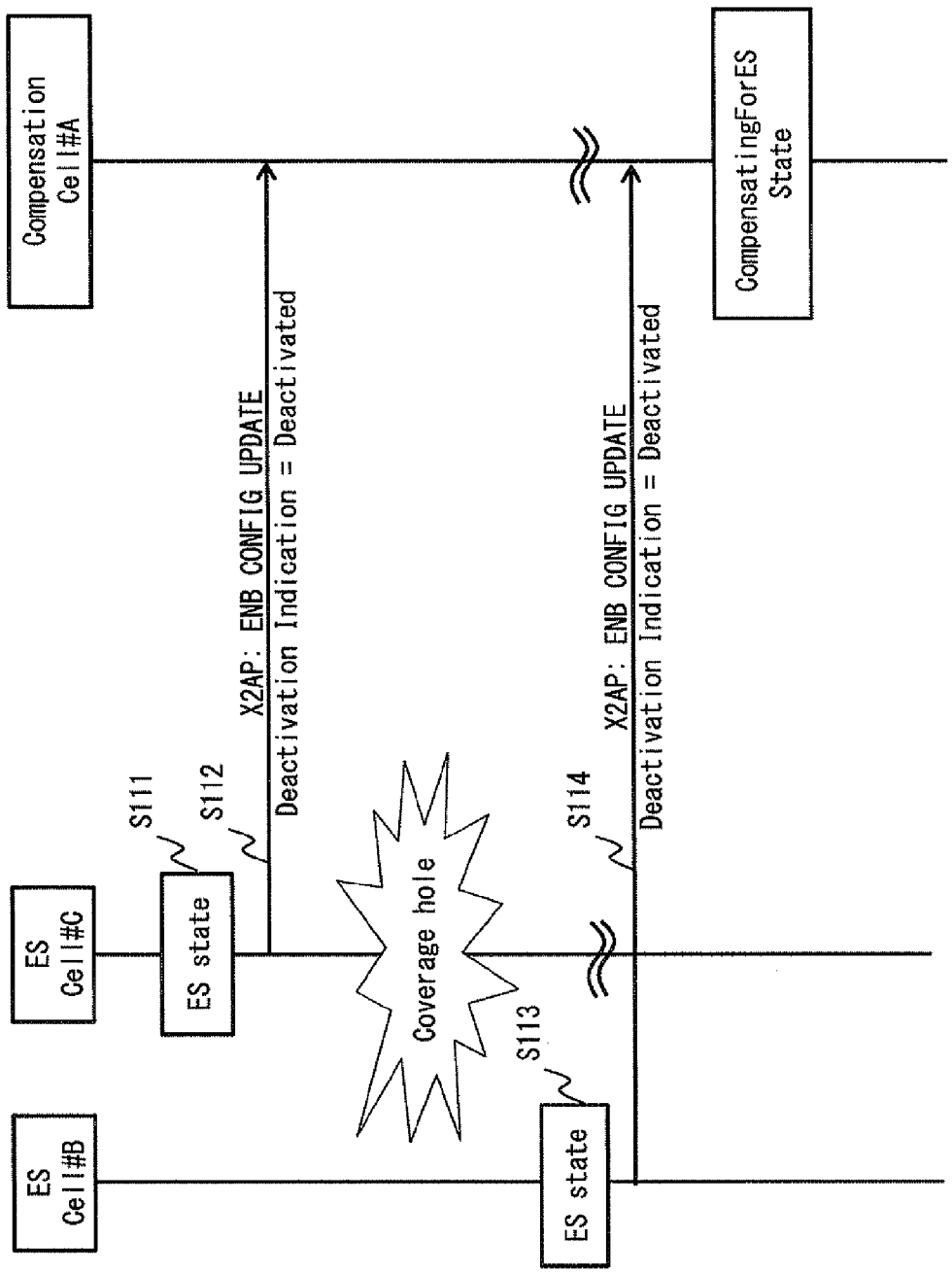
FIG. 16 is a diagram showing a situation in which a coverage hole occurs.

Moreover, by using the mobile communication system according to the first embodiment of the present invention, it is also possible to prevent the occurrence of coverage holes. Here, a situation in which a coverage hole occurs in the network disclosed in Non-Patent Document 1 will be described with reference to FIG. 16. A "coverage hole" is an area which does not belong to the coverage areas of the cells of any of the base stations. FIG. 16 illustrates a case where Compensation Cell #A changes to a compensatingForEnergySaving state after the previously combined ES Cell #B and ES Cell #C have changed to an Energy Saving State.

Initially, ES Cell #C changes to an Energy Saving State (S111). Next, ES Cell #C sends an X2AP: ENB CONFIG UPDATE message to Compensation Cell #A. In the X2AP: ENB CONFIG UPDATE message, the ENUMERATED setting in Deactivation Indication is set to "Deactivated", thereby notifying Compensation Cell #A that ES Cell #C has changed to an Energy Saving State.

Here, when the timing of change to the Energy Saving State is different in ES Cell #B and ES Cell #C, Compensation Cell #A does not provide compensation for cell C for a short while after ES Cell #C has changed to an Energy Saving State. Therefore, a coverage hole occurs from the change of ES Cell #C to an Energy Saving State until the change of Compensation Cell #A to a compensatingForEnergySaving state.

Thereupon, ES Cell #B changes to an Energy Saving State (S113) and sends an X2AP:ENB CONFIG UPDATE message to Compensation Cell #A (S114). The ENUMERATED setting in the Deactivation Indication of the X2AP: ENB CONFIG UPDATE message is set to "Deactivated".

Compensation Cell #A changes to a compensatingForEnergySaving state upon receiving notification that ES Cell #B and ES Cell #C have changed to an Energy Saving State (S115). By changing Compensation Cell #A to a compensatingForEnergySaving state, the coverage hole is eliminated.

On the other hand, in the mobile communications system according to the first embodiment of the present invention, by using a preparations completion message sent by ES Cell #B and ES Cell #C, it is possible to control the timing at which the ES Cell #B and the ES Cell #C change to an Energy Saving State. Consequently, it is possible to prevent the occurrence of a coverage hole in the ES Cell #B or the ES Cell #C. Alternatively, it is possible to minimize the time during which a coverage hole occurs in the ES Cell #B or the ES Cell #C.

Furthermore, in the embodiment described above, an example is described in which an X2AP message is used between Compensation Cell #A and ES Cell #B, and between Compensation Cell #A and ES Cell #C, but the message used is not limited to this. For example, an RRC message routed via the UE may be used between Compensation Cell #A and ES Cell #B and between Compensation Cell #A and ES Cell #C. Moreover, an S1 association message routed via an MME, which is a host device of the eNB, may be used. Furthermore, a message transmitted in the OAM interface may also be used.

Second Embodiment

Figure 7:
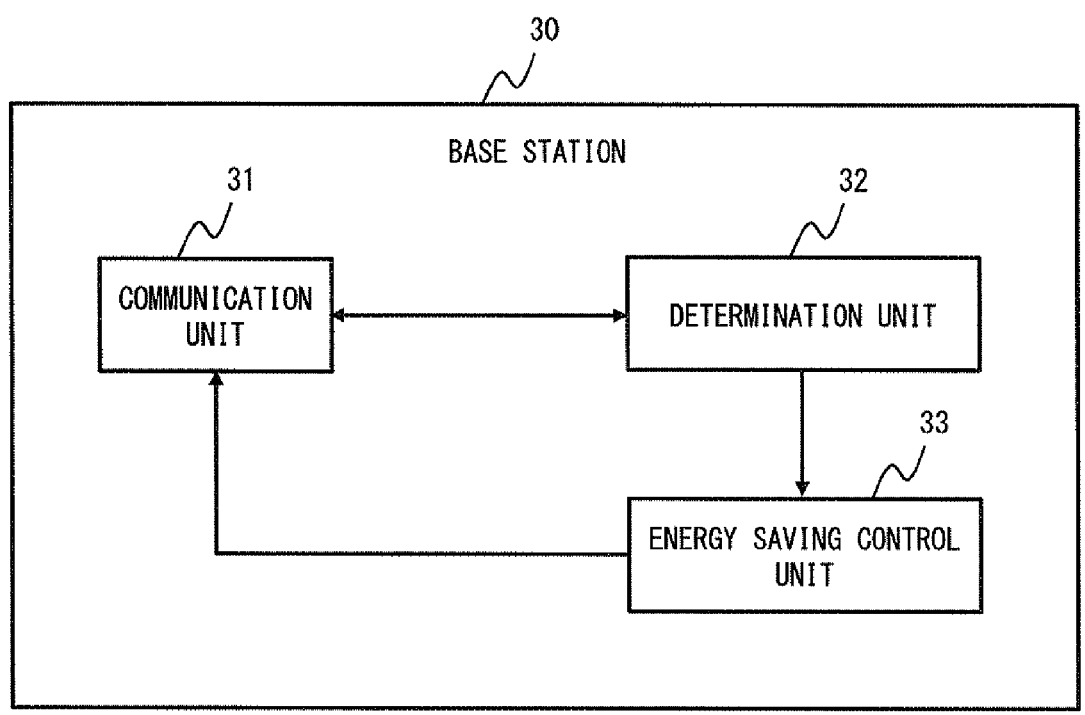
FIG. 7 is a schematic drawing of a base station according to a second embodiment.

Next, an example of the configuration of a base station 30 according to a second embodiment of the present invention will be described with reference to FIG. 7. Here, the base station 30 is described as a base station which is managing an energy saving cell. Moreover, a case is described in which compensation for the energy saving cell managed by the base station 30 is provided by Compensation Cells which are managed by a plurality of other base stations. The base station 30 is provided with a communication unit 31, a determination unit 32 and an energy saving control unit 33. The base station 30 in FIG. 7 differs from the base station 10 in FIG. 2 in including the determination unit 32. Below, the communication unit 31 and the energy saving control unit 33 are described principally in relation to the differences with respect to the communication unit 11 and the energy saving control unit 12 in FIG. 2.

The energy saving control unit 33 sends a preparations completion message to the plurality of base stations via the communication unit 31, upon detecting the timing for changing the base station 30 to an Energy Saving State. The plurality of base stations which have been notified of the preparations completion message are the plurality of base stations which are managing the Compensation Cells that are to compensate for the energy saving cell managed by the base station 30. The detection of the timing at which to change the base station 30 to an Energy Saving State is similar to the detection process described in FIG. 2, and therefore detailed description thereof is omitted here.

The determination unit 32 determines whether or not a change instruction message instructing change to an Energy Saving State has been received from all of the base stations to which the preparations completion message was sent. The determination unit 32 outputs the determination result to the energy saving control unit 33.

Here, if the determination unit 32 determines that a change instruction message has been received from all of the base stations to which the preparations completion message was sent, then the energy saving control unit 33 changes the base station 30 to an Energy Saving State.

Figure 8:
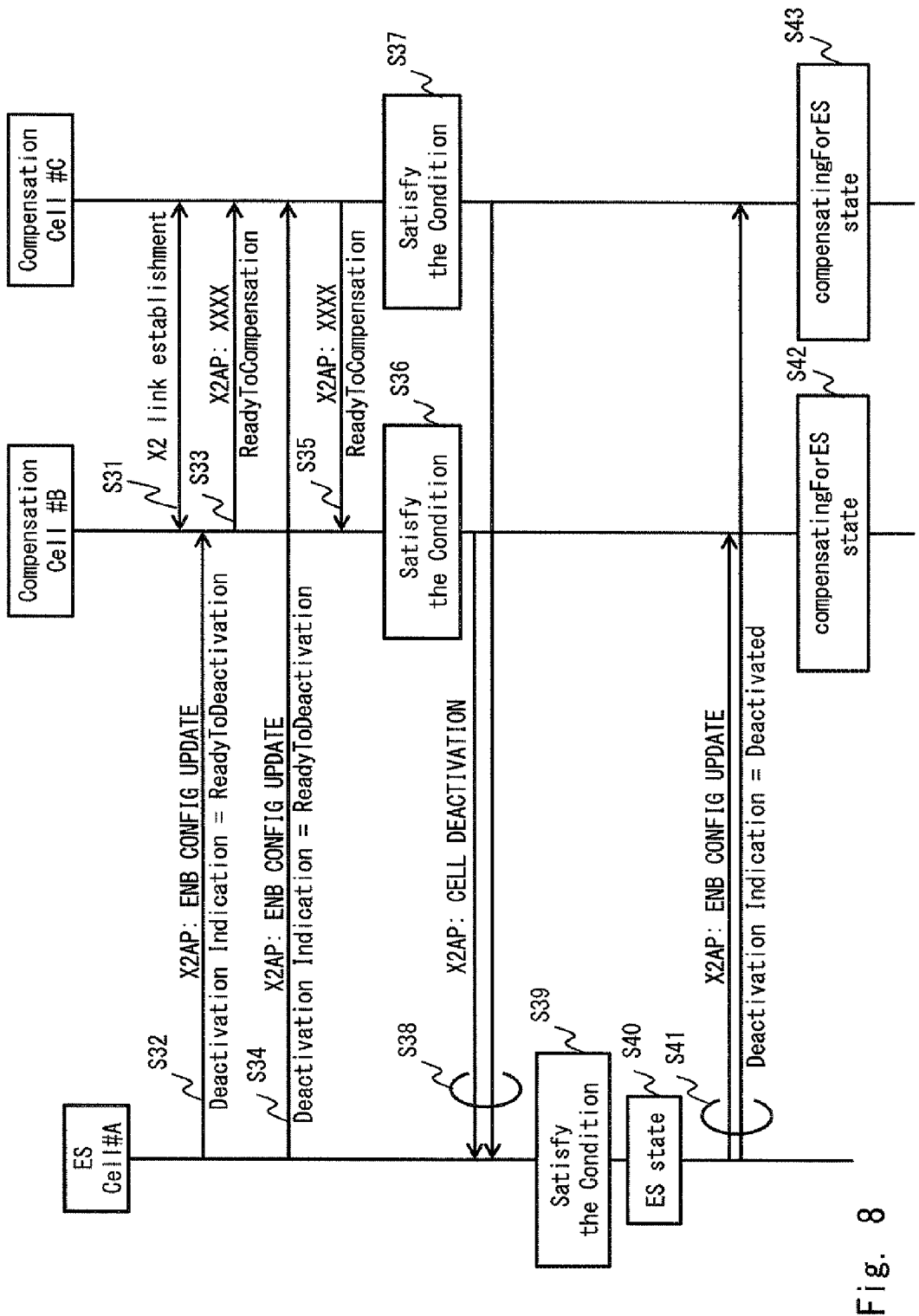
FIG. 8 is a diagram showing a flow of processing for change to an Energy Saving State and a compensatingForEnergySaving state according to the second embodiment.

Next, the flow of processing for change to an Energy Saving State according to a second embodiment of the present invention and the flow of processing for change to a compensatingForEnergySaving state will be described with reference to FIG. 8. In FIG. 8, Compensation Cells #B and #C are presumed to be compensating for cell A which is managed in ES Cell #A. Firstly, Compensation Cell #B and Compensation Cell #C establish an X2 link (S31). Next, upon detecting the timing for change to an Energy Saving State, ES Cell #A sends an X2AP:ENB CONFIG UPDATE message to Compensation Cell #B (S32). Here, the ENUMERATED setting in the Deactivation Indication of the X2AP: ENB CONFIG UPDATE message is set to "ReadyToDeactivation".

Thereupon, Compensation Cell #B uses an X2AP message to notify Compensation Cell #C that "ReadyToDeactivation" has been received from ES Cell #A (S33). The X2AP message used in step S33 may employ an already defined message, or may employ a newly defined message.

Next, ES Cell #A sends an X2AP: ENB CONFIG UPDATE message set to "ReadyToDeactivation" to Compensation Cell #C (S34). Thereupon, Compensation Cell #C uses an X2AP message to notify Compensation Cell #B that "ReadyToDeactivation" has been received from ES Cell #A (S35). In this way, since Compensation Cells #B and #C notify each other that "ReadyToDeactivation" has been received from ES Cell #A, then it is possible to recognize that "ReadyToDeactivation" has been reported to each of the Compensation Cells #B and #C which are combined in order to compensate for ES Cell #A. Consequently, Compensation Cells #B and #C determine that a change instruction message instructing change to an Energy Saving State can be sent to ES Cell #A (S36 and S37).

Next, Compensation Cells #B and #C send an X2AP: CELL DEACTIVATION message to ES Cell #A (S38).

Thereupon, upon determining that an X2AP: Cell DEACTIVATION message has been received from Compensation Cells #B and #C which have received the "ReadyToDeactivation" notification (S39), ES Cell #A changes to an Energy Saving State (S40).

Thereupon, ES Cell #A sends an X2AP:ENB CONFIG UPDATE message to Compensation Cells #B and #C, in order to notify Compensation Cells #B and #C that ES Cell #A has changed to an Energy Saving State (S41). The ENUMERATED setting of the Deactivation Indication in the X2AP: ENB CONFIG UPDATE message sent in step S41 is set to "Deactivated". Next, upon receiving a "Deactivated" notification from ES Cell #A, Compensation Cells #B and #C change to a compensating for ES state (S42, S43).

By using a mobile communication system according to the second embodiment of the present invention described above, it is possible to control the timing of change to an Energy Saving State and a compensatingForEnergySaving state, in a plurality of base stations. More specifically, by using a preparations completion message, it is possible to control the timing at which the base stations are changed to an Energy Saving State. Therefore, for instance, by changing the base stations which are managing cell B and cell C to a compensatingForEnergySaving state after changing the base station which is managing cell A to an Energy Saving State, for example, it is possible to prevent the occurrence of interference between the energy saving cell and the Compensation Cells.

Moreover, similarly to the first embodiment, it is also possible to prevent the occurrence of a coverage hole by controlling the timings of change to an Energy Saving State and a compensatingForEnergySaving state.

Furthermore, in the embodiment described above, an example is described in which an X2AP message is used between ES Cell #A and Compensation Cell #B, and between ES Cell #A and Compensation Cell #C, but the message used is not limited to this. For example, an RRC message routed via the UE may be used between ES Cell #A and Compensation Cell #B and between ES Cell #A and Compensation Cell #C. Moreover, an S1 association message routed via an MME, which is a host device of the eNB, may be used. Furthermore, a message transmitted in the OAM interface may also be used.

Third Embodiment

Next, an initial problem relating to the third embodiment of the present invention will be described with reference to FIG. 17. In FIG. 17, when Cell #2 to Cell #7 have changed to an Energy Saving State, Cell #1 changes to a compensatingForEnergySaving state in order to compensate for Cell #2 to Cell #7. Furthermore, in a situation prior to the change of Cell #2 to Cell #7 to an Energy Saving State, the PCI of Cell #1 is set to B, and the PCI of Cell #10 is also set to B. The PCI (physical cell ID) is used as an identifier for identifying a cell. The PCIs are finite in number. Therefore, when PCIs are allocated to the cells in a mobile communication network, overlapping values may be allocated so as not to affect communications.

On the left-hand side of FIG. 17, although there are cells with the same value B as the PCI, provided that there is no overlap of PCIs in the neighbor cells which are adjacent to Cell #9, then Cell #9 can identify these adjacent neighbor cells uniquely, and consequently there is no problem.

However, when Cell #2 to Cell #7 has changed to an Energy Saving State, and Cell #1 has changed to a compensatingForEnergySaving state in order to compensate for Cell #2 to Cell #7, the area covered by Cell #1 is enlarged.

Consequently, Cell #1 becomes adjacent to Cell #9. In a case of this kind, Cell #1 and Cell #10, which both have a PCI setting of "B", are now both adjacent to Cell #9. Therefore, for example, when the PCI value of "B" is reported in a measurement report for the UE under the control of Cell #9, it is not possible to identify which of Cell #1 and Cell #10 is indicated by the PCI. In a case such as this, a problem arises in that the handover destination of UE under the control of Cell #9 cannot be identified.

Therefore, it is an object of the third embodiment of the present invention to prevent the occurrence of overlapping PCIs ("PCI confusion") in a plurality of cells which are adjacent to a particular cell, or the occurrence of neighboring cells having the same PCI ("PCI collision").

In the third embodiment of the present invention, a "neighbor cell" is newly defined, in addition to an energy saving cell and a Compensation Cell. A neighbor cell is a cell which is adjacent to a particular cell, and the neighbor cell may be set as an energy saving cell or as a Compensation Cell.

Figure 9:
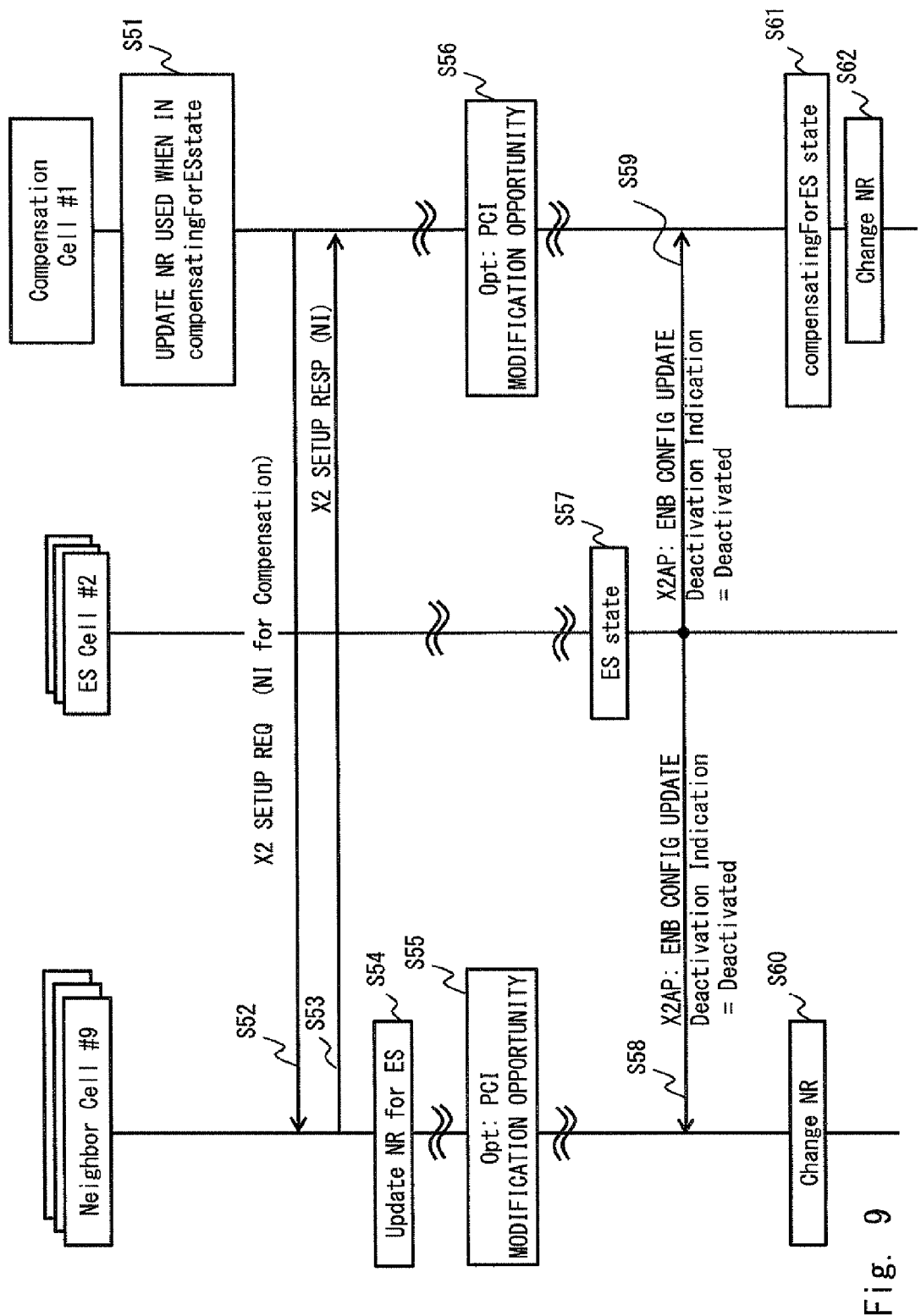
FIG. 9 is a diagram showing a flow of PCI modification processing according to a third embodiment.

Next, a flow of PCI modification processing according to the third embodiment of the present invention will be described with reference to FIG. 9. Neighbor Cell #9, ES Cell #2 and Compensation Cell #1 in FIG. 9 correspond respectively to the cell numbers in FIG. 17.

Firstly, Compensation Cell #1 updates the neighbor cell information (NR: Neighbor cell Relation) upon changing to a compensating for ES state (S51). The NR includes, for example, information relating to the adjacent cells, etc., when changing to a compensating for ES state.

Next, Compensation Cell #1 sends an X2 SETUP REQ message including NI (Neighbor Information) to Neighbor Cell #9 which is adjacent when changing to a compensating for ES state (S52). The NI includes the PCIs of the neighbor cells of Compensation Cell #1 when changing to a compensating for ES state, for example.

Next, Neighbor Cell #9 sends an X2 SETUP RESP message including the NI (S53). This NI includes, for example, the PCIs of the neighbor cells of Neighbor Cell #9.

Next, Neighbor Cell #9 stores the NR which has been sent from Compensation Cell #1, and if the NR already exists, updates the existing NR (S54). Thereupon, Neighbor Cell #9 and Compensation Cell #1 select PCIs which does not give rise to PCI confusion, and update to the selected PCIs. For example, Neighbor Cell #9 may change its own PCI so as not to overlap with the PCIs of the neighbor cells of Compensation Cell #1, and Compensation Cell #1 may change its own PCI so as not to overlap with the PCIs of the neighbor cells of Neighbor Cell #9. Moreover, Neighbor Cell #9 or Compensation Cell #1 may change its own PCI, in such a manner that Neighbor Cell #9 and Compensation Cell #1 have respectively different PCIs. By avoiding the overlapping of PCIs in adjacent cells in this way, it is possible to prevent the occurrence of PCI collision.

Next, when ES Cell #2 changes to an Energy Saving State (S57), ES Cell #2 sends an X2AP: ENB CONFIG UPDATE message to Neighbor Cell #9 and Compensation Cell #1. The Deactivation Indication in the X2AP: ENB CONFIG UPDATE message is set to "Deactivated".

Next, Neighbor Cell #9 applies the NR which has been sent from Compensation Cell #1 (S60). Furthermore, Compensation Cell #1 changes to a compensating for ES state (S61), and applies the updated NR (S62).

Furthermore, steps S11 to S14 in FIG. 4 or steps S32 to S39 in FIG. 8 may be implemented, before ES Cell #2 changes to an Energy Saving State in step S57.

Here, the X2 SETUP REQ/RESP message changed sent in steps S52 and S53 will be described. The information elements shown in FIG. 10 are added under the "Served Cell To Add/Modify" setting in the X2 SETUP REQ/RESP message, in order to add information about the neighbor cells in a case where Compensation Cell #1 has changed to a compensating for ES state.

Figure 11:
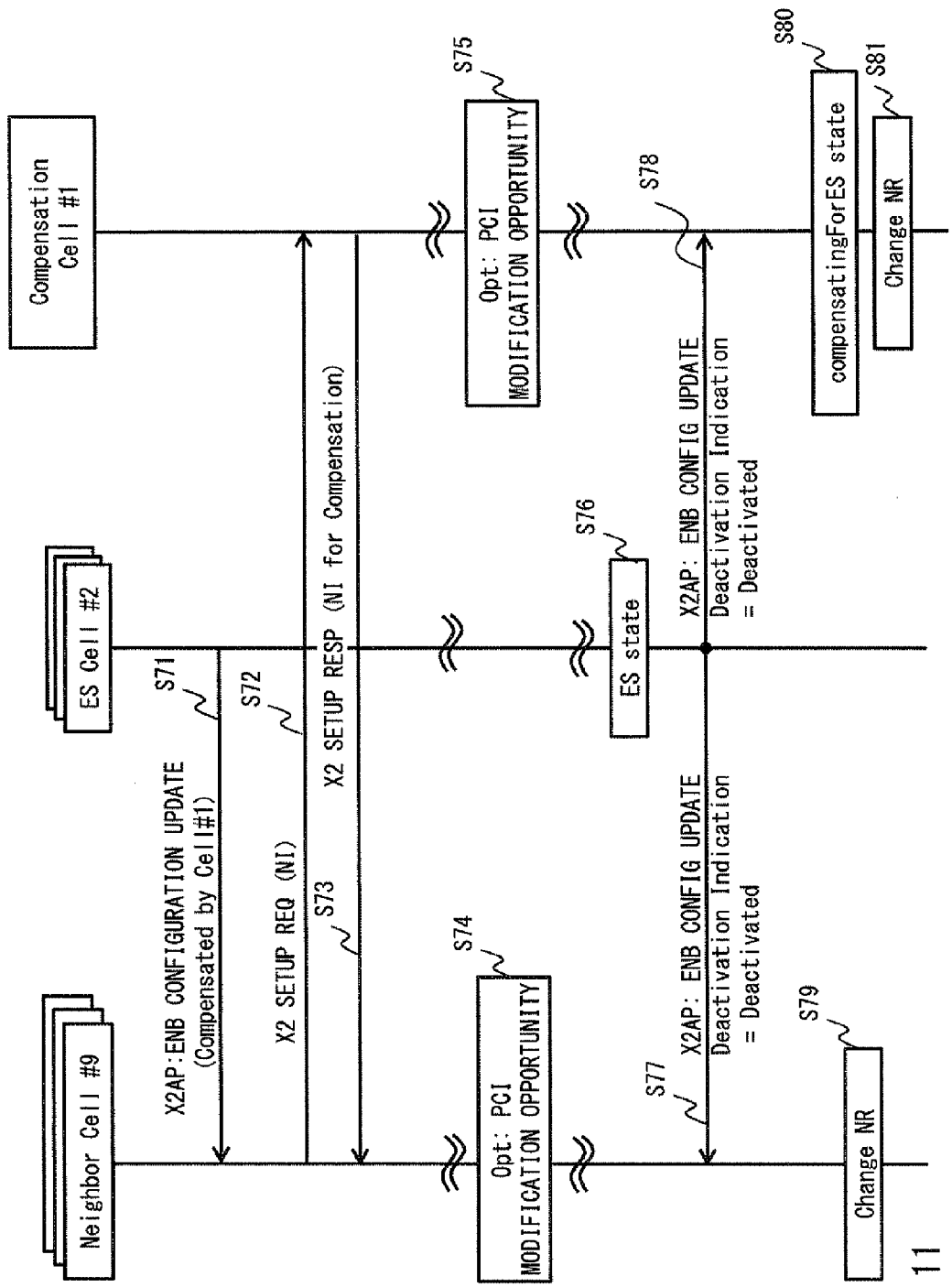
FIG. 11 is a diagram showing a flow of PCI modification processing according to the third embodiment.

Next, a flow of PCI modification processing according to the third embodiment of the present invention, which is different to that shown in FIG. 9, will be described with reference to FIG. 11. In FIG. 9, Compensation Cell #1 itself establishes an X2 link via Neighbor Cell #9 and an X2 interface, whereas FIG. 11 differs from this in that Neighbor Cell #9 establishes an X2 link with Compensation Cell #1.

Firstly, ES Cell #2 sends an ENB CONFIGURATION UPDATE message to Neighbor Cell #9 (S71). The ENB CONFIGURATION UPDATE message includes information indicating that compensation is to be provided by Cell #1 when ES Cell #2 has changed to an Energy Saving State.

Next, Neighbor Cell #9 sends an X2 SETUP REQ message to Compensation Cell #1 (S72). The X2 SETUP REQ message includes NI relating to the neighbor cells of Neighbor Cell #9.

Thereupon, Compensation Cell #1 sends an X2 SETUP RESP message to Neighbor Cell #9 (S73). The X2 SETUP RESP message includes NI relating to neighbor cells when Compensation Cell #1 has changed to a compensating for ES state. Steps S74 to S81 are similar to the steps S55 to S62 shown in FIG. 9, and therefore detailed description thereof is omitted.

Figure 12:
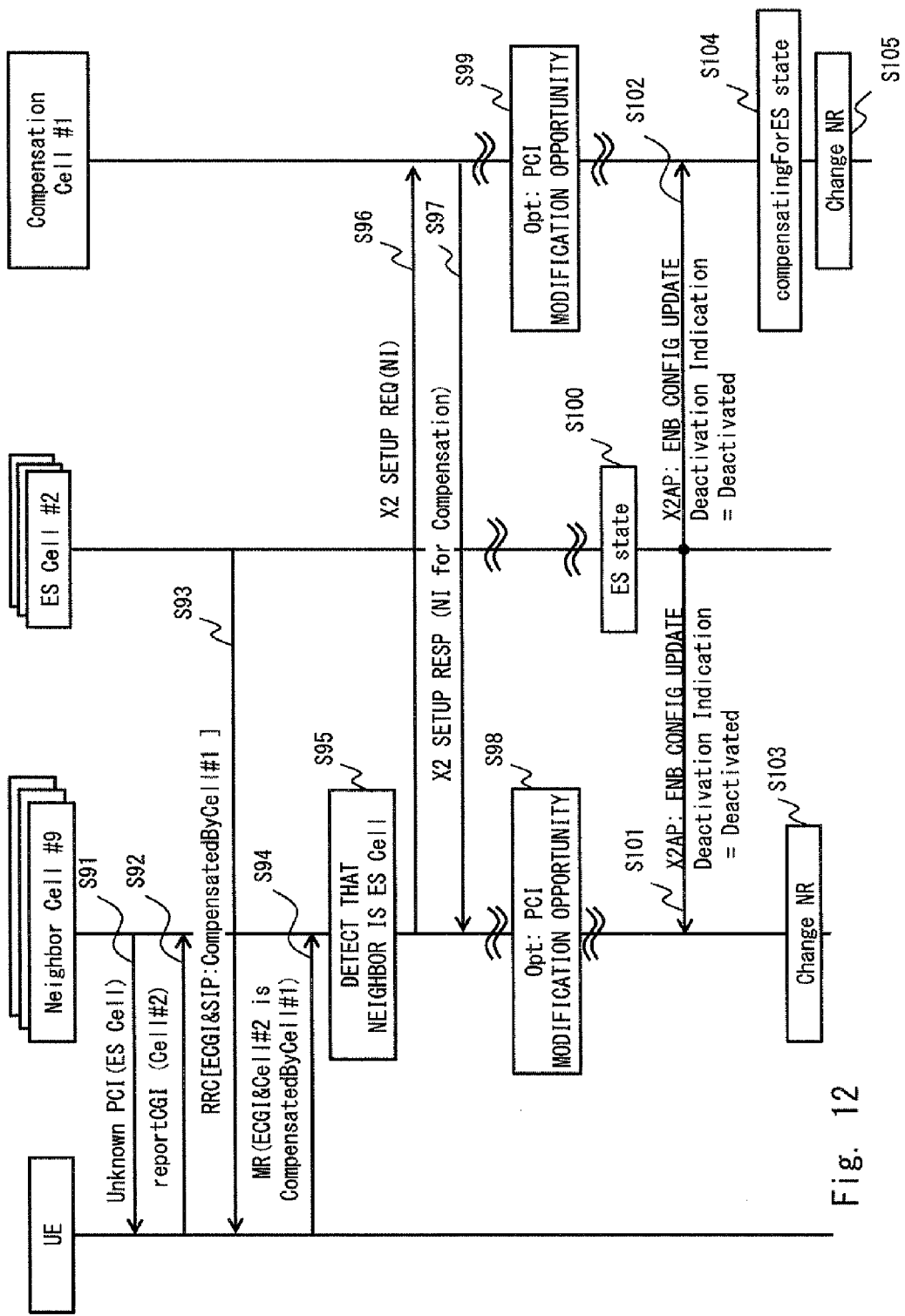
FIG. 12 is a diagram showing a flow of PCI modification processing according to the third embodiment.

Next, a flow of PCI modification processing according to the third embodiment of the present invention, which is different to that shown in FIG. 9 and FIG. 10, will be described with reference to FIG. 12. FIG. 12 differs from FIG. 9 and FIG. 10 in that Neighbor Cell #9 acquires information relating to Compensation Cell #1 which compensates for ES Cell #2, via the UE.

Initially, Neighbor Cell #9 sends an "Unknown PCI (ES Cell)" message to the UE located in Cell #9, in order to enquire about information relating an energy saving cell. Thereupon, the UE sets the measurement result relating to Cell #2 in a "reportCGI" (CGI: Cell Global Identity) message and sends the message.

Next, ES Cell #2 sends an RRCMCGI&SIB: CompensatedByCell#11 message to the UE. The RRCMCGI&SIB: CompensatedByCell#11 message indicates that when ES Cell #2 changes to an Energy Saving State, ES Cell #2 is compensated for by Cell #1.

Thereupon, the UE sends an MR (ECGI&Cell#2 is CompensatedByCell#1) message to Neighbor Cell #9 (S94). Consequently, Neighbor Cell #9 detects that Cell #2 is compensated for by Cell #1 when Cell #2 changes to an Energy Saving State (S95). Steps S96 to S105 are similar to the steps S72 to S81 shown in FIG. 11, and therefore detailed description thereof is omitted.

As described above, by using the PCI modification processing according to the third embodiment of the present invention, it is possible to prevent the occurrence of PCI confusion and PCI collision, even when a base station changes to a compensating for ES state and the overall cell configuration of the network is changed.

Furthermore, by using the PCI modification processing according to the third embodiment of the present invention, the respective eNB in the network can share the NI, and therefore it is possible to prevent the occurrence of PCI confusion and PCI collision, even in a multi-header environment.

Furthermore, in the embodiment described above, an example is described in which the NI is shared by using an X2AP message or an RRC message, but it is also possible to use an S1 message, instead of the X2AP message or RRC message. Alternatively, a message transmitted in the OAM interface may also be used.

Figure 13:
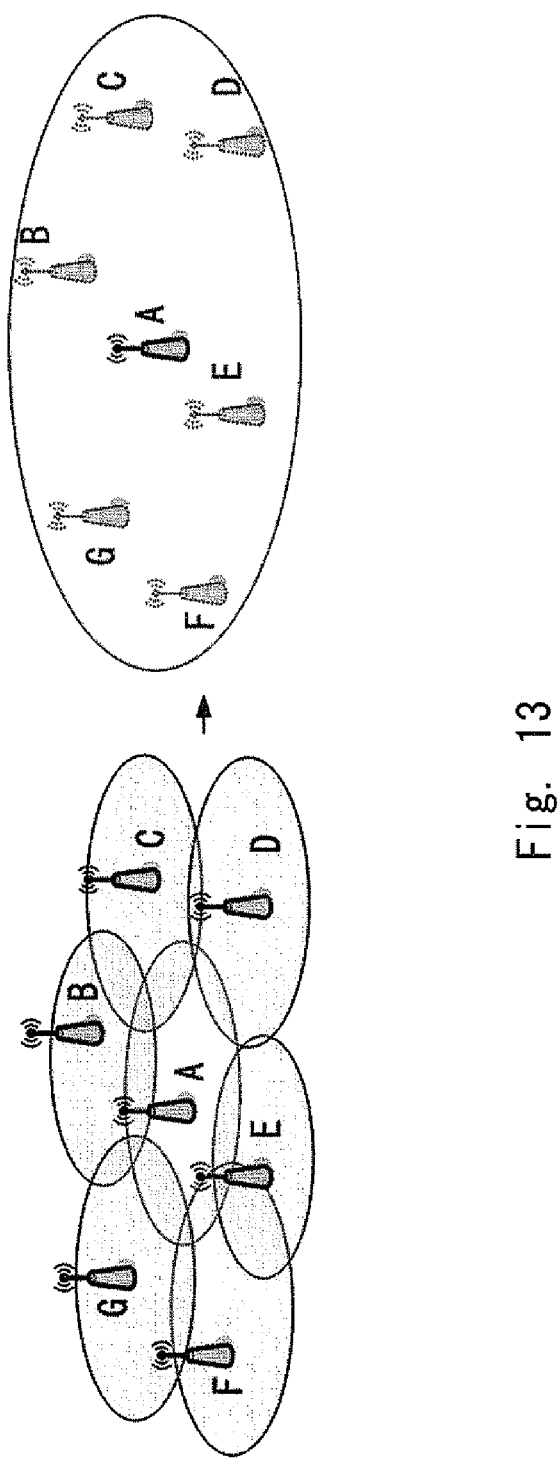
FIG. 13 is a diagram illustrating modification of the network configuration in accordance with the change of the base station to an Energy Saving State.
Figure 14:
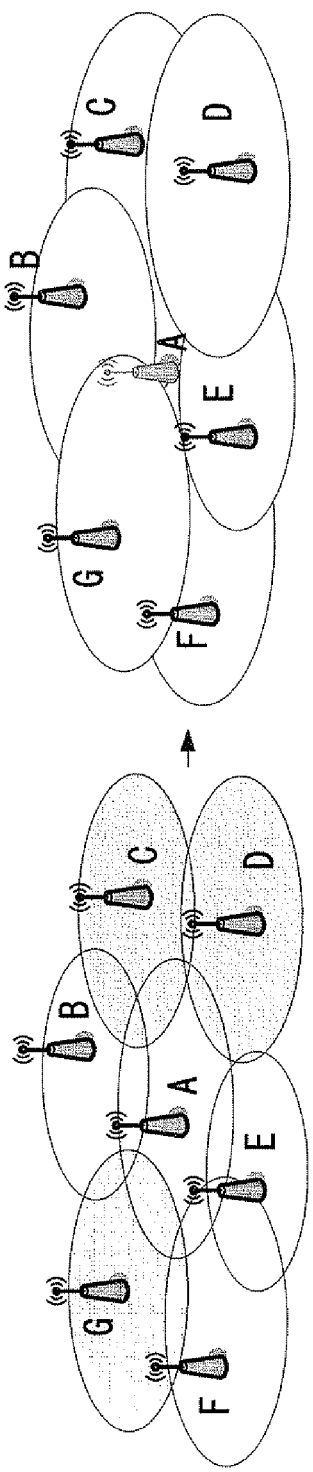
FIG. 14 is a diagram illustrating modification of the network configuration in accordance with the change of the base station to an Energy Saving State.
Figure 15:
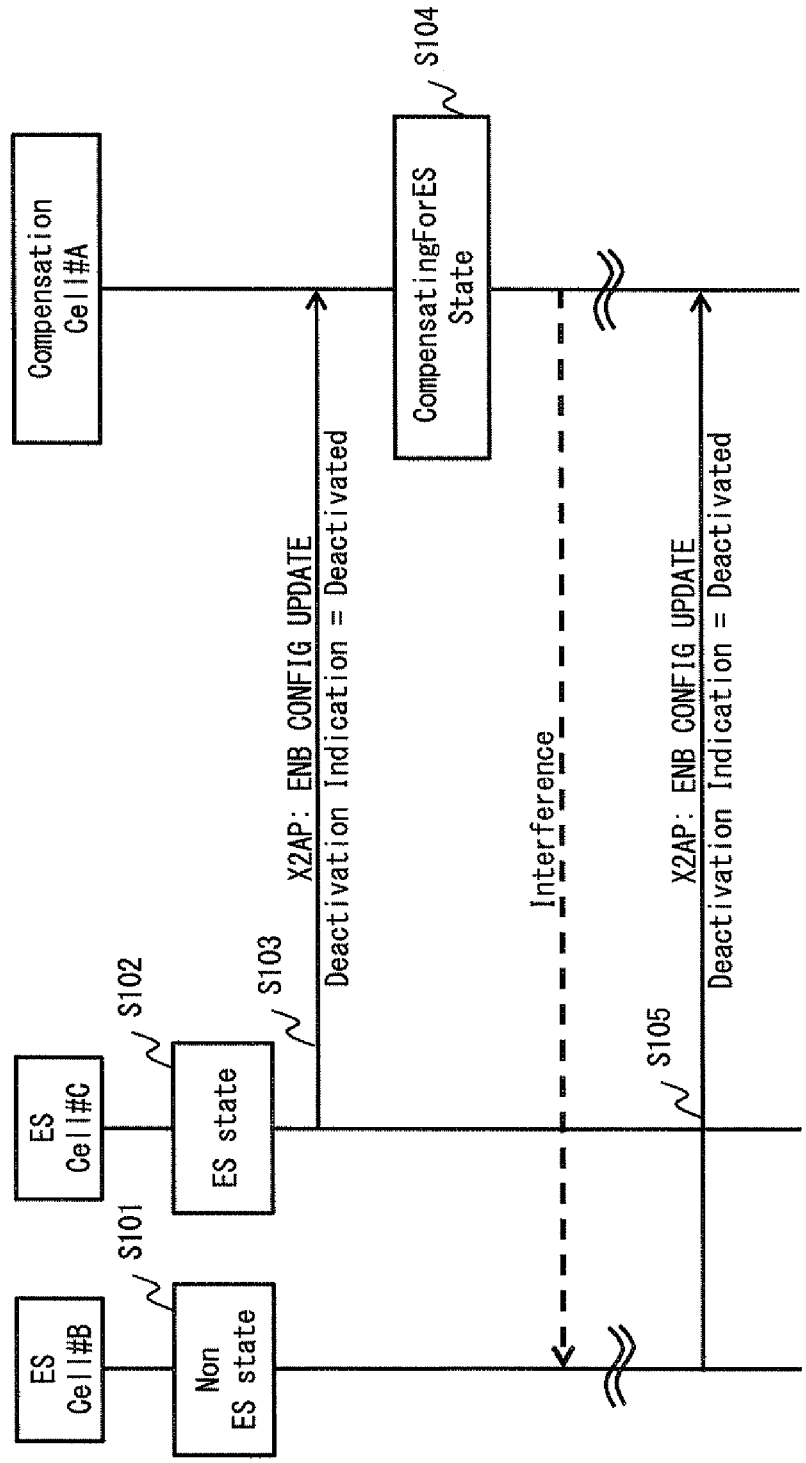
FIG. 15 is a diagram showing a flow of processing in which excessive interference occurs.

Moreover, the third embodiment has been described with respect to the case in FIG. 13, but it is also possible to prevent the occurrence of PCI confusion, in a similar manner, by sharing of NI information by the respective eNB in the case of FIG. 14 also.

The present invention is not limited to the embodiments described above, and may be modified as appropriate, without departing from the essence of the invention.

The embodiments given above have been described in terms of a hardware configuration, but are not limited to this, and the processing in the base stations in FIG. 4, FIG. 6, FIG. 8, FIG. 9, FIG. 11 and FIG. 12 can also be achieved by causing a CPU (Central Processing Unit) to execute a computer program. In this case, the computer program can be supplied to a computer by being stored on a non-transitory computer-readable medium of various types. The non-transitory computer-readable medium includes a tangible recording medium of various types. Examples of a non-transitory computer-readable medium include a magnetic recording medium (for instance, a flexible disk, magnetic tape or hard disk drive), a magneto-optical recording medium (for instance, a magneto-optical disk), a CD-ROM (Read Only Memory), a CD-R, CD-R/W or semiconductor memory (for instance, a mask ROM, PROM (Programmable ROM), EPROM (Erasable PROM), flash ROM or RAM (Random Access Memory)). Furthermore, the program may be supplied to a computer by a transitory computer readable medium of various types. Examples of a transitory computer-readable medium include an electric signal, an optical signal and electromagnetic waves. The transitory computer-readable medium can supply a program to a computer via a cable-based communication path, such as electrical cables or optical fibers, or a wireless communication path.

The present invention has been described here with reference to embodiments, but the present invention is not limited to the embodiments described above. The composition and details of the present invention can be modified variously according to the understanding of a person skilled in the art, within the scope of the invention.

This application claims priority on the basis of Japanese Patent Application No. 2012-260717 filed on 29 Nov. 2012, the entirety of which is incorporated herein.

REFERENCE SIGNS LIST 1 cell
2 cell
10 base station
11 communication unit
12 energy saving control unit
20 base station
21 communication unit
22 determination unit
23 cell compensation control unit
30 base station
31 communication unit
32 determination unit
33 energy saving control unit

The invention claimed is:

1. A mobile communication system, comprising:
a first base station having a first cell; and
a second base station having a second cell;
wherein the first base station comprises:
at least one memory storing instructions, and
at least one processor configured to execute the instructions to:
send, to the second base station, first information indicating that the first cell is prepared to change to an energy saving state, the first information being sent to configure the mobile communication system to a previously-determined combination of:
(1) a plurality of first base stations having first cells in the energy saving state whereby a coverage area of the plurality of first cells is reduced; and
(2) the second cell providing an enlarged coverage area to compensate for the plurality of first cells in the energy saving state; and
wherein the second base station comprises:
at least one memory storing instructions, and
at least one processor configured to execute the instructions to:
receive the first information from the plurality of first base stations; and
upon receiving the first information from all of the plurality of first base stations, send second information to the plurality of first base stations, the second information instructing the plurality of first cells to change to the energy saving state.

2. The mobile communication system according to claim 1, wherein the first information is "ReadyToDeactivation".

3. The mobile communication system according to claim 1, wherein the at least one processor of the first base station is further configured to execute the instructions to send, to the second base station, third information for cancelling change of the first cell to the energy saving state.

4. The mobile communication system according to claim 3, wherein the third information is "notReadyToDeactivation".

5. The mobile communication system according to claim 3, wherein the at least one processor of the first base station is further configured to execute the instructions to send the first and third information via an X2 interface.

6. The mobile communication system according to claim 5, wherein the at least one processor of the first base station is further configured to execute the instructions to send the first and third information by using an X2AP: ENB CONFIG UPDATE message.

7. The mobile communication system according to claim 1, wherein the at least one processor of the second base station is further configured to execute the instructions to send, to the first base station, the second information for instructing the first cell to change to the energy saving state in response to the first information.

8. The mobile communication system according to claim 7, wherein the second information is an X2AP: CELL DEACTIVATION message.

9. The mobile communication system according to claim 1, further comprising a third base station having neighbor cells that are adjacent to the second cell, and
wherein the at least one processor of the second base station is further configured to execute the instructions to:
exchange PCI (physical cell ID) information with the third base station about neighbor cells that are adjacent to the base stations, and coordinate a change of the PCI values of the second and third cells to avoid overlapping of PCIs in the second and third cells.

10. The mobile communication system according to claim 9, wherein the at least one processor of the second base station is further configured to execute the instructions to exchange the PCI information by using an X2 SETUP message.

11. The mobile communication system according to claim 9, wherein the third base station comprising at least one memory storing instructions and at least one processor configured to execute the instructions to receive, from the first base station, information relating to the second base station by using an X2AP: ENB CONFIG UPDATE message.

12. The mobile communication system according to claim 9, wherein the at least one processor of the third base station is further configured to execute the instructions to receive information relating to the second base station via a mobile station located in the third cell.

13. A first base station having a first cell, the first base station comprising:
 a communication device configured to communicate with at least one second base station having a second cell;
 at least one memory storing instructions; and
 at least one processor configured to execute the instructions to:
  send, to the at least one second base station, first information indicating that the first cell is prepared to change to the energy saving state, the first information being sent to configure the first base station and the at least one second base station to a previously determined combination of:
   (1) the first cell in the energy saving state whereby a coverage area of the first cell is reduced; and
   (2) the at least one second cell providing an enlarged coverage area to compensate for the first cell in the energy saving state;
  receiving second information from the at least one second base station, the second information for instructing the first cell to change to the energy saving state; and
  changing the first cell to the energy saving state.

14. A computer-implemented communication method used in a first base station having a first cell, the method implemented by at least one processor and comprising:
 sending, to at least one second base station having a second cell, first information indicating that the first cell is prepared to change to the energy saving state, the first information being sent to configure the first base station and the at least one second base station to a previously determined combination of:
  (1) the first cell in the energy saving state whereby a coverage area of the first cell is reduced; and
  (2) the at least one second cell providing an enlarged coverage area to compensate for the first cell in the energy saving state;
 receiving second information from the at least one second base station, the second information for instructing the first cell to change to the energy saving state; and
 changing the first cell to the energy saving state.

15. A non-transitory computer-readable storage medium storing instructions that, when executed on at least one processor of a first base station having a first cell, cause the at least one processor to perform a method, the method comprising:
 sending, to at least one second base station having a second cell, first information indicating that the first cell is prepared to change to the energy saving state, the first information being sent to configure the first base station and the at least one second base station to a previously determined combination of:
  (1) the first cell in the energy saving state whereby a coverage area of the first cell is reduced; and
  (2) the at least one second cell providing an enlarged coverage area to compensate for the first cell in the energy saving state;
 receiving second formation from the at least one second base station, the second information for instructing the first cell to change to the energy saving state; and
 changing the first cell to the energy saving state.

16. A mobile communication system, comprising:
 a first base station having a first cell; and
 a second base station having a second cell;
 wherein the first base station comprises:
  at least one memory storing instructions; and
  at least one processor configured to execute the instructions to:
   send, to a plurality of second base stations, a first information indicating that the first cell is prepared to change to an energy saving state, the first information being sent to configure the mobile communication system to a previously determined combination of:
    (1) the first cell in the energy saving state whereby a coverage area of the first cell is reduced; and
    (2) the plurality of second cells providing an enlarged coverage area to compensate for the first cell in the energy saving state;
 wherein the plurality of second base station each comprises:
  at least one memory storing instructions; and
  at least one processor configured to execute the instructions to:
   send, to the first base station, second information instructing the first cell to change to the energy saving state; and
 wherein the at least one processor of the first base station is further configured to execute the instructions, upon the first base station receiving the second information from all of the plurality of second base stations, to change the first cell to the energy saving state.

17. The mobile communication system according to claim 16, wherein the first information is "ReadyToDeactivation".

18. The mobile communication system according to claim 16, wherein the at least one processor of the first base station is further configured to execute the instructions to send, to the second base station, third information for cancelling change of the first cell to the energy saving state.

19. The mobile communication system according to claim 18, wherein the third information is "notReadyToDeactivation".

20. The mobile communication system according to claim 18, wherein the at least one processor of the first base station is further configured to execute the instructions to send the first and third information via an X2 interface.

21. The mobile communication system according to claim 20, wherein the at least one processor of the first base station is further configured to execute the instructions to send the first and third information by using an X2AP: ENB CONFIG UPDATE message.

22. The mobile communication system according to claim 16, wherein the at least one processor of the second base station is further configured to execute the instructions to send, to the first base station, the second information instructing the first cell to change to the energy saving state in response to the first information.

23. The mobile communication system according to claim 22, wherein the second information is an X2AP: CELL DEACTIVATION message.

24. The mobile communication system according to claim 16, further comprising a third base station having neighbor cells that are adjacent to one of the plurality of second cells, and
wherein the at least one processor of the second base station is further configured to execute the instructions to:
exchange PCI (physical cell ID) information with the third base station about neighbor cells that are adjacent to the base stations, and
coordinate a change of the PCI values of the second and third cells to avoid overlapping of PCIs in the second and third cells.

25. The mobile communication system according to claim 24, wherein the at least one processor of the second base station is further configured to execute the instructions to exchange the PCI information by using an X2 SETUP message.

26. The mobile communication system according to claim 24, wherein the third base station comprising at least one memory storing instructions and at least one processor configured to execute the instructions to receive, from the first base station, information relating to the second base station by using an X2AP: ENB CONFIG UPDATE message.

27. The mobile communication system according to claim 24, wherein the at least one processor of the third base station is further configured to execute the instructions to receive information relating to the second base station via a mobile station located in the third cell.

28. A first base station having a first cell, the first base station comprising:
a communication device configured to communicate with at least one second base station having a second cell;
at least one memory storing instructions; and
at least one processor configured to execute the instructions to:
receive, from the at least one second base station, first information indicating that the second cell is prepared to change to the energy saving state, the first information being sent to configure the first base station and the at least one second base station to a previously determined combination of:
(1) the at least one second cell in the energy saving state whereby a coverage area of the at least one second cell is reduced; and
(2) the first cell providing an enlarged coverage area to compensate for the at least one second cell in the energy saving state; and
upon receiving the first information from the at least one second base station, send second information to the at least one second base station, the second information instructing the at least one second cell to change to the energy saving state.

29. A computer-implemented communication method used in a first base station having a first cell, the method implemented by at least one processor and comprising:
receiving, from at least one second base station having a second cell, first information indicating that the at least one second cell is prepared to change to the energy saving state, the first information being sent to configure the first base station and the at least one second base station to a previously determined combination of:
(1) the at least one second cell in the energy saving state whereby a coverage area of the at least one second cell is reduced; and
(2) the first cell providing an enlarged coverage area to compensate for the at least one second cell in the energy saving state; and
upon receiving the first information from the at least one second base station, sending second information to the at least one second base station, the second information instructing the at least one second cell to change to the energy saving state.

30. A non-transitory computer-readable storage medium storing instructions that, when executed on at least one processor of a first base station having a first cell, cause the at least one processor to perform a method, the method comprising:
receiving from at least one second base station having a second cell, first information indicating that the at least one second cell is prepared to change to the energy saving state, the first information being sent to configure the first base station and the at least one second base station to a previously determined combination of:
(1) the at least one second cell in the energy saving state whereby a coverage area of the at least one second cell is reduced; and
(2) the first cell providing an enlarged coverage area to compensate for the at least one second cell in the energy saving state; and
upon receiving the first information from the at least one second base station, sending second formation to the at least one second base station, the second information instructing the at least one second cell to change to the energy saving state.

* * * * *